(12) United States Patent
Toyoda et al.

(10) Patent No.: US 11,242,016 B2
(45) Date of Patent: Feb. 8, 2022

(54) GROMMET AND WIRE HARNESS

(71) Applicant: Yazaki Corporation, Tokyo (JP)

(72) Inventors: Ryohei Toyoda, Aichi (JP); Yasunori Hattori, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/063,083

(22) Filed: Oct. 5, 2020

(65) Prior Publication Data

US 2021/0101543 A1 Apr. 8, 2021

(30) Foreign Application Priority Data

Oct. 7, 2019 (JP) .............................. JP2019-184310

(51) Int. Cl.
  *B60R 16/02* (2006.01)
  *H02G 3/22* (2006.01)
  *H01B 7/00* (2006.01)
  *H01B 17/58* (2006.01)

(52) U.S. Cl.
  CPC ................................ *B60R 16/0222* (2013.01)

(58) Field of Classification Search
  CPC ............ B60R 16/0222; B60R 16/0215; B60R 16/0207; H02G 3/22
  See application file for complete search history.

(56) References Cited

U.S. PATENT DOCUMENTS

| | | | |
|---|---|---|---|
| 2002/0036098 A1* | 3/2002 | Okuhara | B60R 16/0222 174/152 G |
| 2004/0154819 A1* | 8/2004 | Sakata | B60R 16/0222 174/650 |
| 2010/0181097 A1 | 7/2010 | Nagayasu | |
| 2010/0307794 A1* | 12/2010 | Baydoun | H02G 3/22 174/152 G |
| 2011/0265286 A1* | 11/2011 | Paku | B60R 16/0222 16/2.2 |
| 2015/0129303 A1 | 5/2015 | Shitamichi et al. | |
| 2018/0265018 A1 | 9/2018 | Yabashi | |

FOREIGN PATENT DOCUMENTS

| | | | |
|---|---|---|---|
| EP | 1190913 A2 | | 3/2002 |
| EP | 2360063 A1 | | 8/2011 |
| JP | 2002-152949 A | | 5/2002 |
| JP | 2003230213 A | * | 8/2003 |
| JP | 2011223756 A | * | 11/2011 |
| JP | 2017-010638 A | | 1/2017 |

* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

A grommet includes: a water stopping part with an annular shape; a first partition wall part and a second partition wall part that form closing parts disposed on one side and the other side, respectively, of the water stopping part in an axial direction; a tubular part and a tubular part provided penetrating centers of the first partition wall part and the second partition wall part, respectively, and allowing a wiring material to be inserted thereinto; and a plurality of slit parts that divide one of the tubular parts, that is, the tubular part and the second partition wall part provided with the tubular part continuously to the water stopping part.

5 Claims, 8 Drawing Sheets

GROMMET AND WIRE HARNESS

CROSS-REFERENCE TO RELATED APPLICATION(S)

The present application claims priority to and incorporates by reference the entire contents of Japanese Patent Application No. 2019-184310 filed in Japan on Oct. 7, 2019.

BACKGROUND OF THE INVENTION

1. Field of the Invention

The present invention relates to a grommet and a wire harness.

2. Description of the Related Art

One example of the conventional grommets to be mounted in a vehicle is disclosed in Japanese Patent Application Laid-open No. 2017-010638. The grommet according to this literature is attached to a penetration hole that is formed in a vehicle body panel through which a wire harness is inserted. This grommet includes a small-diameter tubular part, a diameter-expanding tubular part, a closing surface part, and an auxiliary tubular part. The small-diameter tubular part includes an insertion hole through which the wire harness is inserted. The diameter-expanding tubular part is formed to expand outward from the small-diameter tubular part and extend in an axial direction of the small-diameter tubular part, and has an annular groove formed along an outer peripheral part thereof. To the annular groove, a peripheral part of the penetration hole can be fitted. The closing surface part extends from an inner peripheral surface of the diameter-expanding tubular part to the inside in a radial direction, and closes the diameter-expanding tubular part. The auxiliary tubular part extends from the closing surface part to one side in the axial direction, and forms the insertion hole through which the wire harness is inserted. In addition, this grommet includes partial dividing slits in the closing surface part and the auxiliary tubular part. The partial dividing slits allow the elastic deformation in the die casting to make the die cutting easy.

Incidentally, the grommet as disclosed in Japanese Patent Application Laid-open No. 2017-010638 enables the die cutting by the partial dividing slits. The partial dividing slits, however, divide the auxiliary tubular part into two sections to the middle of the closing surface part. Therefore, it has been difficult to perform the die cutting that can form the complicated internal structure with the function inside the grommet.

SUMMARY OF THE INVENTION

The present invention has been made in view of the above circumstance, and it is an object to provide a grommet and a wire harness that can improve the die release property.

In order to achieve the above mentioned object, a grommet according to one aspect of the present invention includes a water stopping part with an annular shape that is inserted into a penetration hole formed in an attachment panel so as to stop water; closing parts disposed on one side and the other side, respectively, of the water stopping part in an axial direction in a manner of stretching to an inside in a radial direction of the water stopping part so as to close the annular shape of the water stopping part; tubular parts provided penetrating centers of the closing parts, respectively, and allowing a wiring material to be inserted thereinto; and a plurality of slit parts that divide one of the tubular parts and one of the closing parts that is provided with the one tubular part continuously to the water stopping part.

According to another aspect of the present invention, in the grommet, it is possible to configure that the slit parts are disposed at equal intervals with the one tubular part being a center.

According to still another aspect of the present invention, in the grommet, it is possible to configure that the slit parts divide the one tubular part and the one closing part into four sections.

According to still another aspect of the present invention, in the grommet, it is possible to further include at least one pipe member provided penetrating the other closing part, wherein at least one of the slit parts is formed surrounding the pipe member.

In order to achieve the above mentioned object, a wire harness according to still another aspect of the present invention includes a wiring material with conductivity; and a grommet provided to the wiring material, wherein the grommet includes: a water stopping part with an annular shape that is inserted into a penetration hole formed in an attachment panel so as to stop water; closing parts disposed on one side and the other side, respectively, of the water stopping part in an axial direction in a manner of stretching to an inside in a radial direction of the water stopping part so as to close the annular shape of the water stopping part; tubular parts provided penetrating centers of the closing parts, respectively, and allowing a wiring material to be inserted thereinto; and a plurality of slit parts that divide one of the tubular parts and one of the closing parts that is provided with the one tubular part continuously to the water stopping part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are hereinafter described in detail with reference to the drawings. Note that the present invention is not limited by these embodiments. The components to be described in the embodiments below include the component that can be replaced easily by a person skilled in the art or that is substantially the same.

Embodiment

Figure 1:
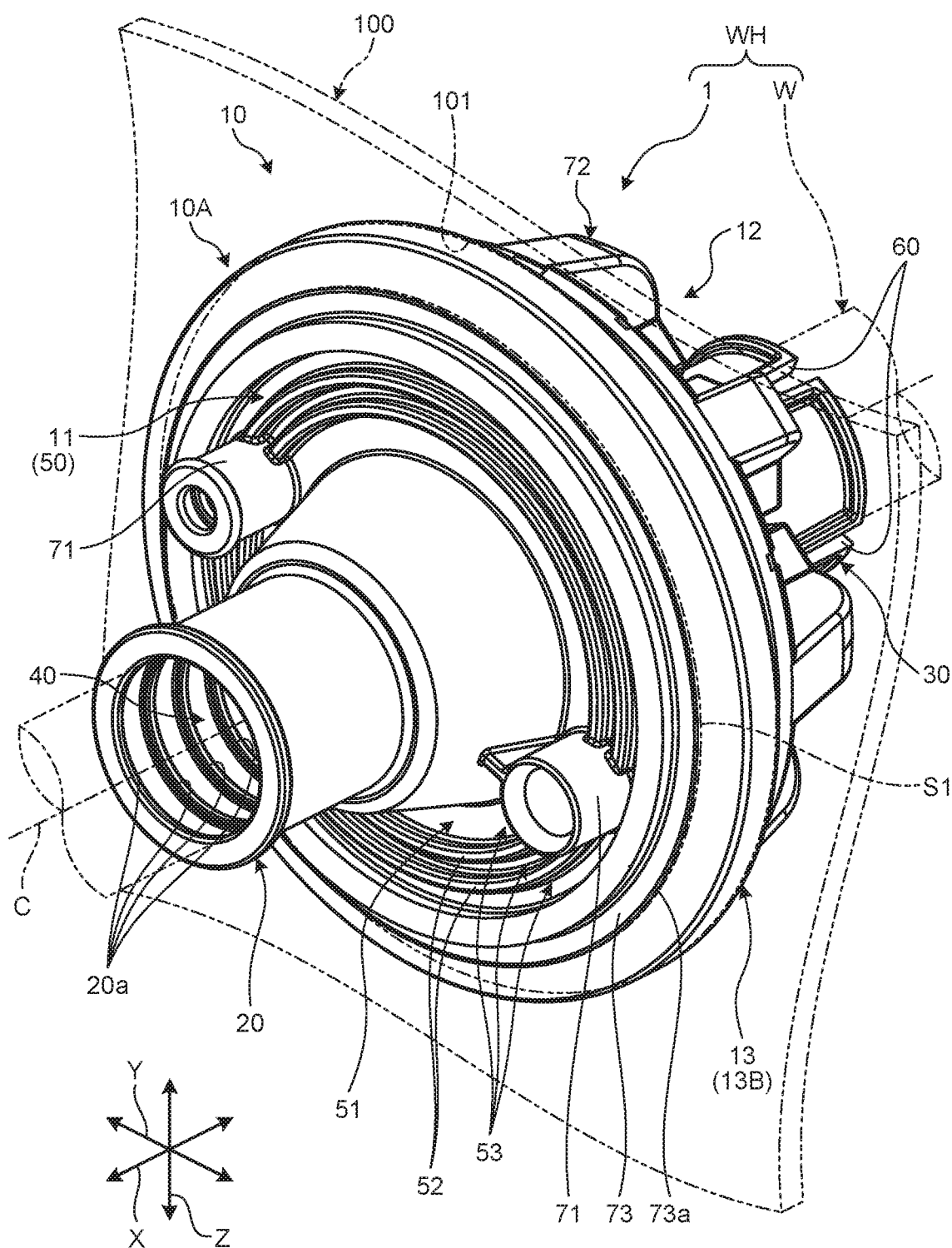
FIG. 1 is a perspective view illustrating a schematic structure of a wire harness in which a grommet according to one embodiment is used.
Figure 2:
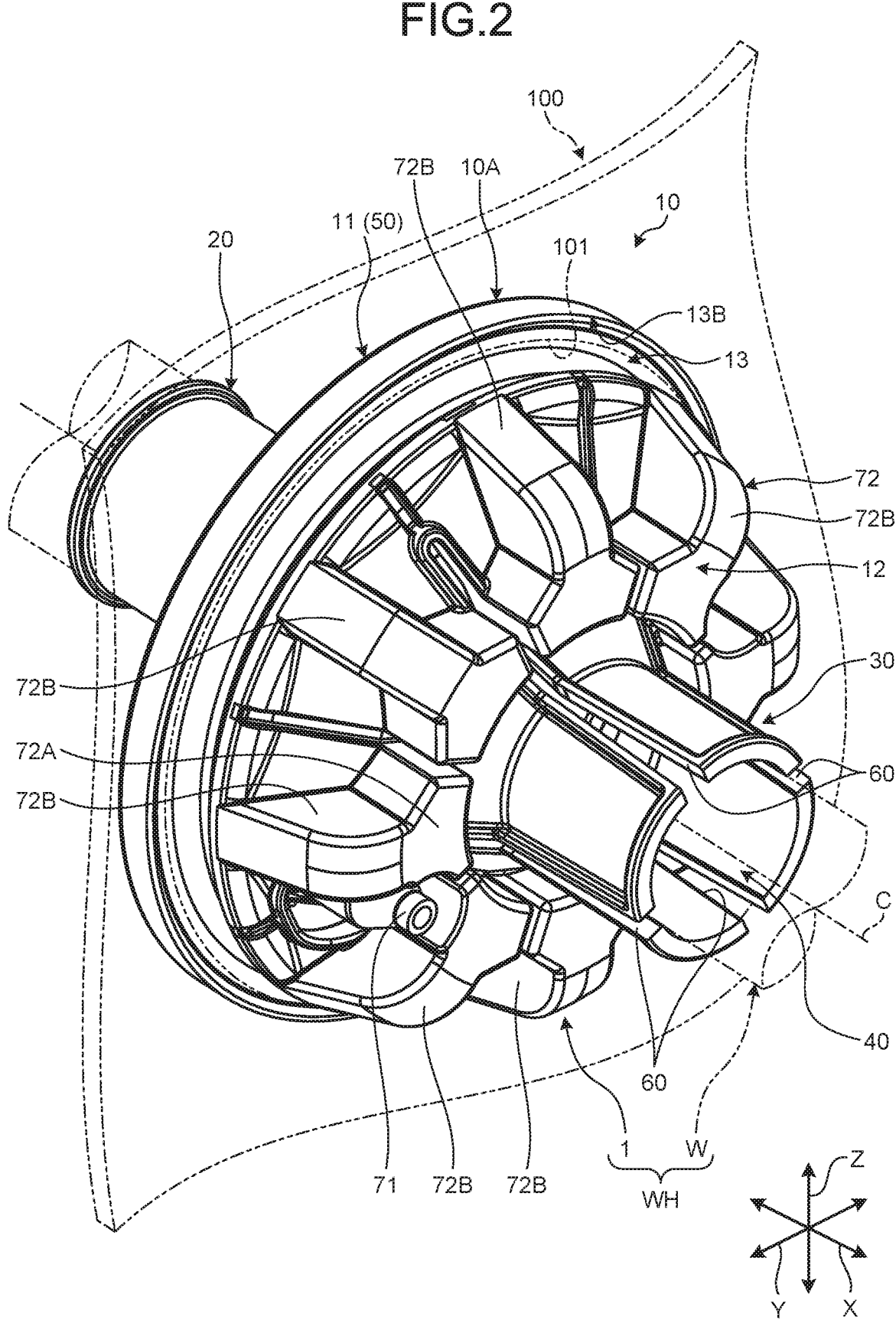
FIG. 2 is a perspective view illustrating the schematic structure of the wire harness in which the grommet according to the embodiment is used.
Figure 3:
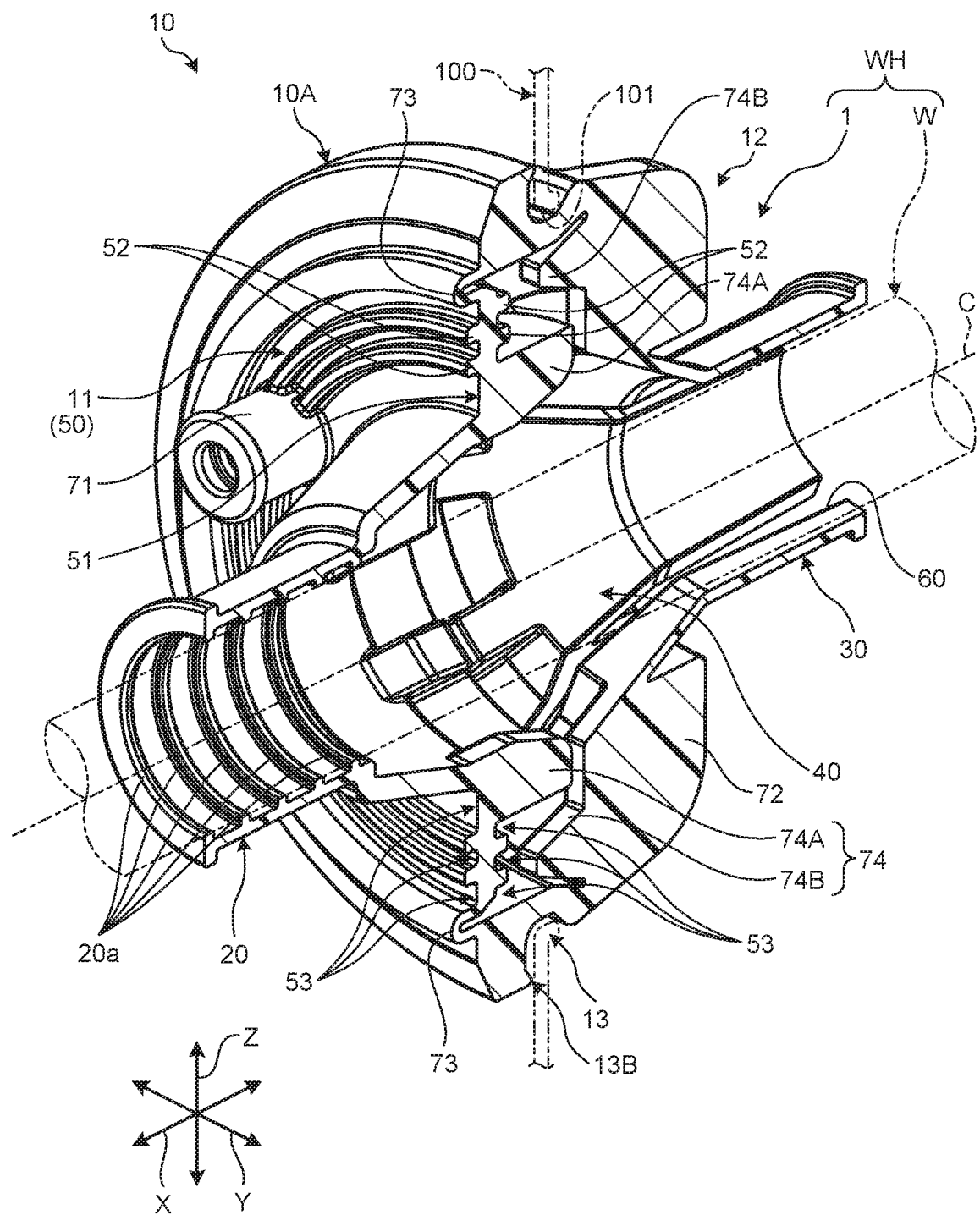
FIG. 3 is a cross-sectional perspective view illustrating the schematic structure of the wire harness in which the grommet according to the embodiment is used.

A grommet 1 according to an embodiment that is illustrated in FIG. 1, FIG. 2, and FIG. 3 is incorporated in a wire harness WH that is wired in a vehicle or the like. The wire harness WH is formed in a manner that, for example, a plurality of wiring materials W used in the connection between devices to be mounted in the vehicle for power supply or signal communication are bundled into an assembly, and the wiring materials W are connected to each device with a connector or the like. The wire harness WH includes the wiring material W that is conductive and the grommet 1 that is provided to the wiring material W and has the wiring material W inserted thereinto. The wire harness WH may further include various components, for example, an exterior member such as a corrugate tube, a resin tape, or a protector, a junction box, and a fixing tool. The wiring material W is formed of, for example a metal bar, an electric wire, an electric wire bundle, or the like. The metal bar is a conductive bar-like member externally covered with an insulating covering part. The electric wire is a conductor (core) formed of a plurality of conductive metal lines that is externally covered with an insulating covering part. The electric wire bundle is a bundle of the electric wires. The wire harness WH bundles and unifies the wiring materials W and electrically connects between the devices through connectors or the like provided at terminals of the bundled wiring materials W.

When the wiring material W is wired across two spaces that are sectioned with an attachment panel 100, which corresponds to an attachment target, as a border through a penetration hole 101 provided to the attachment panel 100, the grommet 1 is used in the penetration hole 101. The attachment panel 100 is, for example, a metal plate that forms a body of the vehicle, and the penetration hole 101 penetrates the attachment panel 100 along a plate thickness direction. The two spaces that are sectioned with the attachment panel 100 as the border are typically a space in the vehicle (for example, cabin) and a space outside the vehicle (for example, engine compartment). The grommet 1 is assembled to the penetration hole 101 in a state where the wiring material W of the wire harness WH is inserted into the grommet 1 and the grommet 1 is externally attached to the wiring material W; thus, the grommet 1 protects the wiring material W that passes the penetration hole 101 and stops water (is waterproof) at the penetration hole 101. The grommet 1 also has functions of preventing dust and blocking noise in addition to the waterproof function for the penetration hole 101, for example. The structure of the grommet 1 is described in detail with reference to each drawing.

Note that the wiring material W and the attachment panel 100 are illustrated roughly with a two-dot chain line in FIG. 1, FIG. 2, and FIG. 3, and in the other drawings, the illustration of the wiring material W and the attachment panel 100 is omitted. Of a first direction, a second direction, and a third direction that intersect with each other, the first direction is referred to as "axial direction X", the second direction is referred to as "width direction Y", and the third direction is referred to as "height direction Z" below. The axial direction X, the width direction Y, and the height direction Z are orthogonal to each other typically. Here, the axial direction X corresponds to the plate thickness direction of the attachment panel 100 described above, and corresponds to the direction where the wiring material W and the grommet 1 are inserted into the penetration hole 101. In other words, the axial direction X is the direction along an extending direction of the wiring material W that is inserted into the grommet 1. The width direction Y and the height direction Z correspond to an extending direction of the attachment panel 100. Here, in order to make it easier to understand the explanation, it is assumed that the wiring material W is wired linearly along the axial direction X; however, the present embodiment is not limited to this example and the axial direction X may be a bent direction while the grommet 1 is attached to the attachment panel 100, and the grommet 1 and the wiring material W may be provided in a partially bent state. Moreover, the directions employed in the following description are the directions while the grommet 1 is assembled to the attachment panel 100 unless otherwise stated. A central axial line C, which passes a center of the penetration hole 101, is orthogonal to a plate surface of the attachment panel 100, and extends along the axial direction X. A direction that is orthogonal to the central axial line C is referred to as a radial direction, a side away from the central axial line C is referred to as outside in the radial direction, and a side closer to the central axial line C is referred to as inside in the radial direction.

Specifically, the grommet 1 according to the embodiment is a sealing member that has the wiring material W inserted inside along the axial direction X and can stop water at the penetration hole 101 in the attachment panel 100 as illustrated in FIG. 1, FIG. 2, and FIG. 3. The grommet 1 includes a main body part 10, a tubular part 20, and a tubular part 30, and is formed as an elastic body in which these parts are unified. The grommet 1 is formed of, for example, an insulating elastic resin material that has low rigidity and high flexibility, such as rubber or thermoplastic elastomer (for example, ethylene-propylene-diene rubber (EPDM)).

The main body part 10 is a part that is fitted to the penetration hole 101, stops water at the penetration hole 101, and allows the wiring material W to be inserted thereinto along the axial direction X. The main body part 10 includes a first partition wall part (closing part) 11, a second partition wall part (closing part) 12, and a water stopping part 13.

The first partition wall part 11 and the second partition wall part 12 are each formed to have an annular plate shape with the central axial line C extending along the axial line X. The first partition wall part 11 and the second partition wall part 12 face each other on one side and the other side in the axial direction X with a space therebetween in the axial direction X, and are unified by the water stopping part 13. Here, the water stopping part 13 is an outer peripheral part 10A that is provided in the annular shape at the end part that is positioned outside the first partition wall part 11 and the second partition wall part 12 in the radial direction (the direction orthogonal to the central axial line C). The first partition wall part 11 and the second partition wall part 12 are disposed on one side and the other side of the water stopping part 13 in the axial direction X in a manner of stretching to the inside in the radial direction of the water stopping part 13 so as to close the annular shape of the water stopping part 13. The first partition wall part 11 and the second partition wall part 12 are formed to have a shape with at least one of them (here, the second partition wall part 12) swelling to the outside in the axial direction X. The first partition wall part 11 and the second partition wall part 12 are formed so that, as a whole, the internal space has a hollow dome shape while the first partition wall part 11 and the second partition wall part 12 are unified by the water stopping part 13. The first partition wall part 11 has a tubular part 20 connected to a surface thereof that is opposite to the second partition wall part 12 side in the axial direction X. The second partition wall part 12 has a tubular part 30 connected to a surface thereof that is opposite to the first partition wall part 11 side in the axial direction X.

Here, the second partition wall part 12 includes protrusions 72 that protrude to the outside (the side opposite to the first partition wall part 11 in the axial direction X) as illustrated in FIG. 1 to FIG. 8. The protrusions 72 include annular protrusions 72A formed in the annular shape around the central axial line C so as to surround a base end part of the tubular part 30, and radial protrusions 72B that extend from the annular protrusions 72A to the outside in the radial direction and that are positioned radially around the central axial line C. In the present embodiment, eight radial protrusions 72B are provided at equal intervals in the circumferential direction. Such protrusions 72 improve the strength of the second partition wall part 12 and suppress the deformation.

The water stopping part 13 is formed so as to unify the first partition wall part 11 and the second partition wall part 12 therebetween. The water stopping part 13 is positioned on the outside in the radial direction from the position where the thickness changes with respect to the first partition wall part 11, and in the present embodiment, positioned on the outside in the radial direction from a virtual circle S1 (see FIG. 1) passing the position of a radial outer end 73a (see FIG. 5 and FIG. 6) of a folding part 73, which is described below, with the central axial line C being a center. Moreover, the water stopping part 13 is positioned on the outside in the radial direction from the position where the thickness changes with respect to the second partition wall part 12, and in the present embodiment, positioned on the outside in the radial direction from a virtual circle S2 (see FIG. 4) passing the position of a radial outer end 72Ba (see FIG. 5 and FIG. 6) of the radial protrusion 72B of the protrusion 72 with the central axial line C as the center. The water stopping part 13 includes a fitting groove part 13A and a lip part 13B. The fitting groove part 13A is formed as an annular groove part whose center is the central axial line C. While the main body part 10 is fitted to the penetration hole 101, an edge that forms the penetration hole 101 in the attachment panel 100 is fitted to the fitting groove part 13A.

The lip part 13B is a pleated-shape part that is formed along the fitting groove part 13A. Here, the lip part 13B is formed to have an annular shape along the fitting groove part 13A at an end part of the fitting groove part 13A on the first partition wall part 11 side. That is to say, the lip part 13B is provided to the fitting groove part 13A and has an annular shape with the central axial line C as the center. While the end part of the penetration hole 101 is fitted to the fitting groove part 13A, the lip part 13B is in contact with the surface of the end part (here, the surface on the first partition wall part 11 side) and stops water at the surface. The lip part 13B is in close contact with the surface of the end part that forms the penetration hole 101 by the elastic deformation, and seals the entire periphery of the penetration hole 101.

The tubular parts 20 and 30 have the tubular shape formed together with the main body part 10, and allow the wiring material W to be inserted thereinto along the axial direction X.

The tubular part 20 is formed to protrude from the first partition wall part 11 to the other side (the side opposite to the second partition wall part 12) along the axial direction X. The tubular part 20 is formed to have a cylindrical shape with the central axial line C as the center, and extends along the axial direction X. The tubular part 20 is formed to have a cylindrical shape whose diameter is smaller than that of the first partition wall part 11. The tubular part 20 has an end part, which is on the other side in the axial direction X, open and a base end part, which is on the one side, connected to the first partition wall part 11. The tubular part 20 is connected penetrating a substantially central position of the first partition wall part 11 in the width direction Y and the height direction Z. Here, the tubular part 20 is formed to increase in diameter as the base end part on the first partition wall part 11 side in the axial direction X gets closer to the first partition wall part 11. The tubular part 20 has a plurality of lip parts 20a formed on an inner peripheral surface thereof. The lip parts 20a are each formed to have an annular shape along the circumferential direction (direction around the central axial line C) and serve as a pleated water stopping part. The lip parts 20a are positioned at intervals along the axial direction X. Each lip part 20a is in contact with an external surface of the wiring material W with the wiring material W inserted thereinto so as to stop water at the external surface. Each lip part 20a is structured to get in close contact with the external surface of the wiring material W by the elastic deformation so as to seal the entire periphery of the wiring material W.

The tubular part 30 is formed to protrude from the second partition wall part 12 to one side (the side opposite to the first partition wall part 11) along the axial direction X. The tubular part 30 is formed to have a cylindrical shape with the central axial line C as the center, and extends along the axial direction X. The tubular part 30 is formed to have a cylindrical shape whose diameter is smaller than that of the second partition wall part 12. The tubular part 30 has an end part, which is on the one side in the axial direction X, open and a base end part, which is on the other side, connected to the second partition wall part 12 in the penetrating manner. The tubular part 30 is connected to a substantially central position of the second partition wall part 12 in the width direction Y and the height direction Z. Here, the tubular part 30 is formed to increase in diameter as the base end part on the second partition wall part 12 side in the axial direction X gets closer to the second partition wall part 12. The tubular part 30 has a base end 30a thereof (see FIG. 5 and FIG. 6) positioned at a radial inner end 72Aa (see FIG. 5 and FIG. 6) of the annular protrusion 72A provided to the second partition wall part 12.

In the grommet 1 with the above structure, an internal space part formed by the main body part 10, the tubular part 20, and the tubular part 30 functions as an insertion space part 40. The insertion space part 40 is a space part where the wiring material W is inserted, and continues along the tubular part 20, the main body part 10, and the tubular part 30 along the axial direction X. In the grommet 1, the wiring material W is inserted along the axial direction X into the insertion space part 40 that is formed to communicate with the tubular part 20, the main body part 10, and the tubular part 30.

The grommet 1 is attached to the wiring material W in a manner that the wiring material W is inserted into the insertion space part 40, and then, together with the terminal of the wiring material W, the tubular part 20 or the tubular part 30 is inserted into the penetration hole 101. Then, as the main body part 10 is fitted to the penetration hole 101 so that the end part of the penetration hole 101 is fitted to the water stopping part 13 of the main body part 10, the grommet 1 is assembled to the attachment panel 100. When the grommet 1 is in this state, the lip part 13B is in close contact with the surface of the periphery of the penetration hole 101 while the lip part 13B is elastically deformed, and thus, the entire periphery of the penetration hole 101 is sealed. The grommet 1 may stop water at the opening of the tubular parts 20 and 30 in a manner that a winding tape or the like is wound along the wiring material W inserted into the insertion space part 40, the tubular parts 20 and 30, and the wiring material W.

In this manner, when the main body part 10 is fitted to the penetration hole 101 of the attachment panel 100, the grommet 1 and the wire harness WH stop the water at the penetration hole 101 and moreover, allow the wiring material W to be inserted thereinto.

The grommet 1 according to the present embodiment includes slit parts 60 in the second partition wall part 12 with the above structure and the tubular part 30 provided to the second partition wall part 12.

Figure 4:
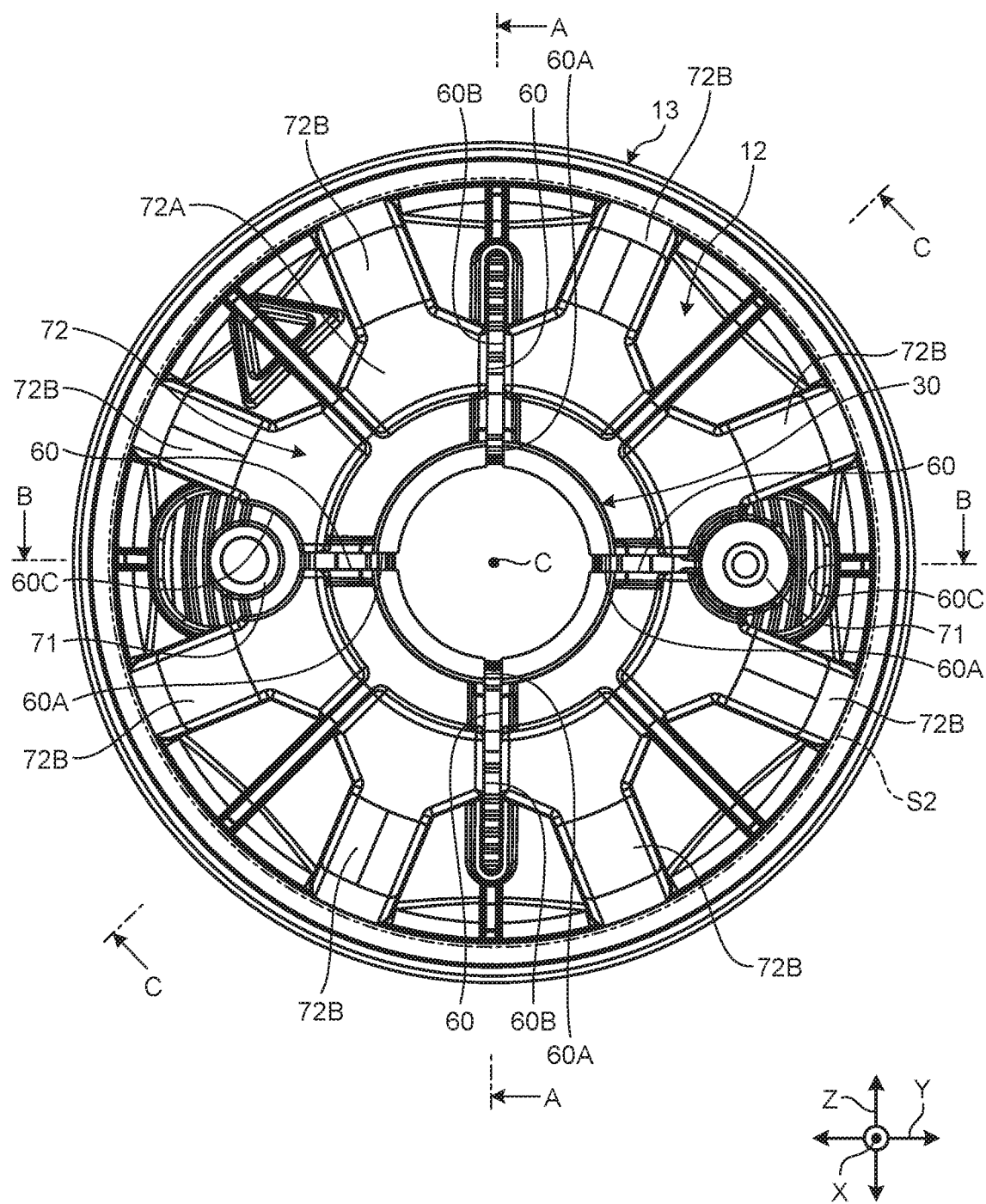
FIG. 4 is a front view of the grommet according to the embodiment.
Figure 5:
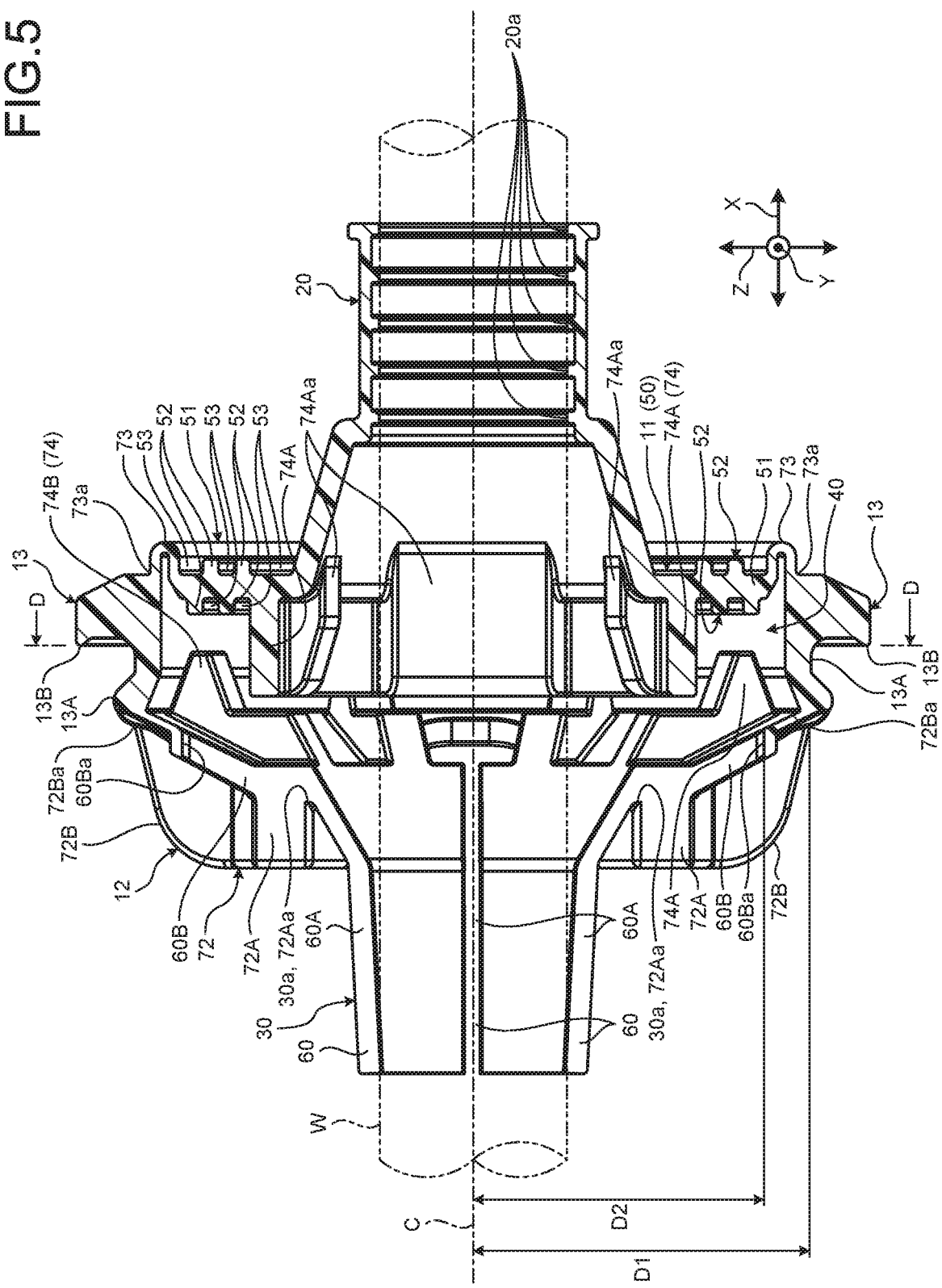
FIG. 5 is a cross-sectional view taken along A-A in FIG. 4.
Figure 6:
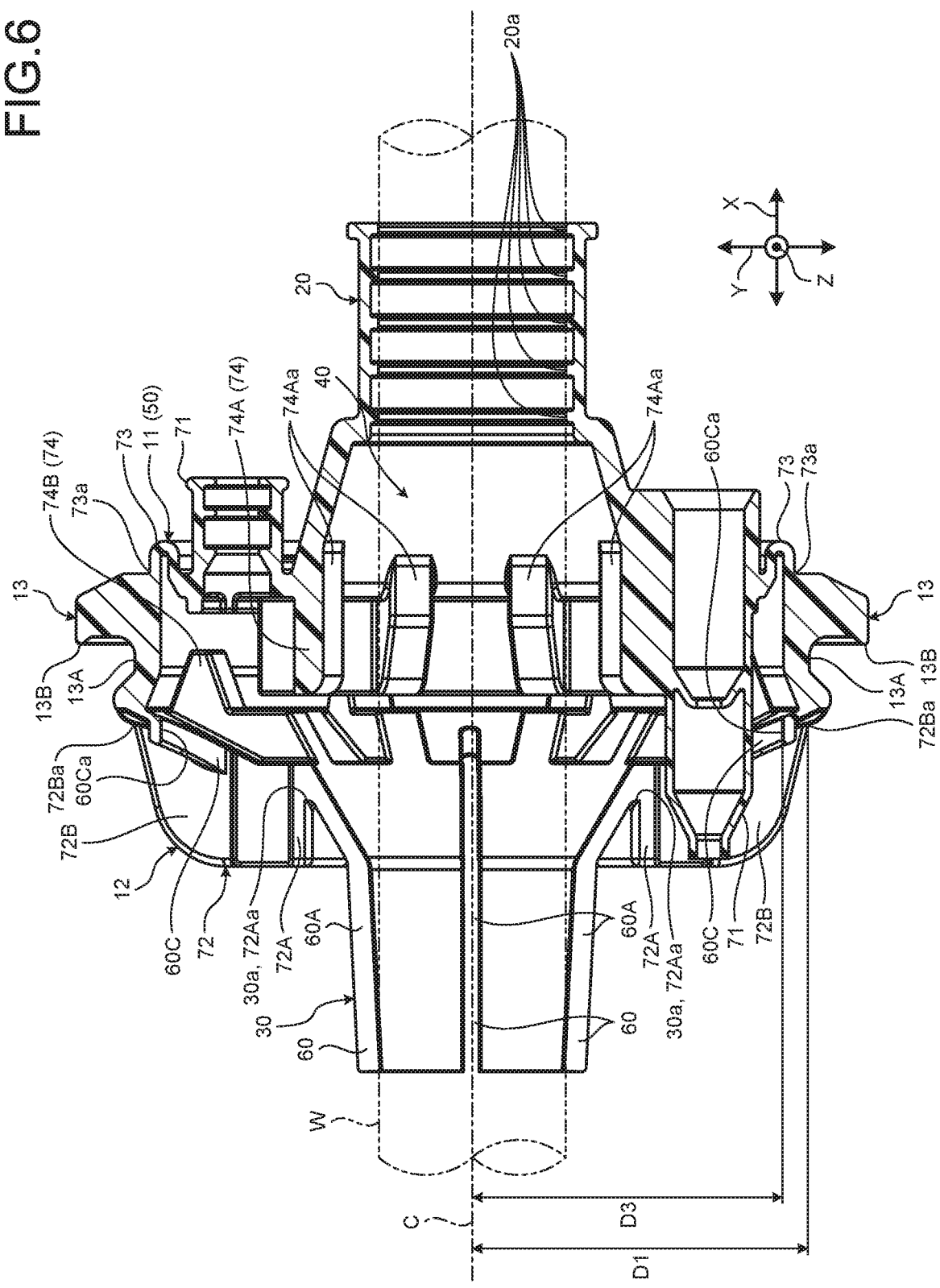
FIG. 6 is a cross-sectional view taken along B-B in FIG. 4.

The slit part 60 is described below. As illustrated in FIG. 4 to FIG. 6, the slit parts 60 are provided to the tubular part 30 and the second partition wall part 12 and divide the tubular part 30 and the second partition wall part 12. The slit parts 60 are formed linearly along the axial direction X and the radial direction in the tubular part 30 and the second partition wall part 12, and formed at intervals in the circumferential direction around the central axial line C. The slit parts 60 include tubular part slit parts 60A formed in the tubular part 30 and partition wall part slit parts 60B and 60C formed in the second partition wall part 12.

The tubular part slit part 60A is formed continuously from the open end part of the tubular part 30 to the base end part thereof as illustrated in FIG. 4 and FIG. 5. The tubular part slit parts 60A are provided to at least two positions in the circumferential direction of the tubular part 30, and in the present embodiment, at four positions. The tubular part slit parts 60A are preferably disposed at equal intervals in the circumferential direction. That is to say, it is preferable that, in the case of the two positions, the tubular part slit parts 60A are positioned at every 180° in the circumferential direction, in the case of the three positions, the tubular part slit parts 60A are positioned at every 120° in the circumferential direction, and in the case of the four positions, the tubular part slit parts 60A are positioned at every 90° in the circumferential direction. In this manner, the tubular part slit parts 60A divide the tubular part 30 into a plurality of sections in the circumferential direction. A winding tape or the like is wound around the section of the tubular part 30 that is divided by the tubular part slit part 60A together with the inserted wiring material W, so that the water entry from the opening of the tubular part 30 is prevented.

The partition wall part slit part 60B continues to the tubular part slit part 60A, and is positioned ranging from the base end part of the tubular part 30 to the second partition wall part 12. In the present embodiment, the partition wall part slit parts 60B exist at two positions continuously with respect to the tubular part slit parts 60A at the two positions as illustrated in FIG. 4 and FIG. 5. Specifically, the partition wall part slit parts 60B at the two positions are provided to extend to the outside in the radial direction (Z direction), continuing to the tubular part slit parts 60A that exist at two positions at every 1800 in the circumferential direction so as to face each other in the Z direction. Radial outer ends 60Ba (see FIG. 5) of the partition wall part slit parts 60B at the two positions continue to the water stopping part 13 on the outside in the radial direction. In this manner, the partition wall part slit parts 60B continue to the tubular part slit parts 60A and divide the second partition wall part 12 into a plurality of sections. Regarding the position of the radial outer end 60Ba of the partition wall part slit part 60B that continues to the water stopping part 13, it means the position ranging to the position where the thickness of the water stopping part 13 changes with respect to the second partition wall part 12. In addition, the position ranging to the water stopping part 13 means the position to the virtual circle S2 with the central axial line C as the center. Furthermore, regarding the position of the radial outer end 60Ba of the partition wall part slit part 60B, when the distance from the central axial line C to the radial outer end 72Ba of the radial protrusion 72B on the outside in the radial direction is D1, the minimum distance D2 from the central axial line C to the radial outer end 60Ba of the partition wall part slit part 60B on the outside in the radial direction is preferably at least 0.8 times longer.

The partition wall part slit part 60C continues to the tubular part slit part 60A, and is positioned ranging from the base end part of the tubular part 30 to the second partition wall part 12. In the present embodiment, the partition wall part slit parts 60C exist at two positions continuously with respect to the tubular part slit parts 60A at the two positions as illustrated in FIG. 4 and FIG. 6. Specifically, the partition wall part slit parts 60C at the two positions are provided to continue to the tubular part slit parts 60A that are provided at the two positions at every 180° in the circumferential direction so as to face each other in the Y direction with the central axial line C therebetween, and exist at the two positions with a bag-like shape (balloon shape). Radial outer ends 60Ca (see FIG. 6) of the partition wall part slit parts 60C at the two positions continue to the water stopping part 13 on the outside in the radial direction. The partition wall part slit parts 60C are formed to surround a pipe member 71. The pipe member 71 is provided penetrating the first partition wall part 11 as illustrated in FIG. 1, FIG. 4, and FIG. 6. The number of pipe members 71 is at least one, and in the present embodiment, two. The pipe members 71 are provided at two positions at every 1800 in the circumferential direction so as to face each other in the Y direction with the central axial line C therebetween. This pipe member 71 is used to have a pipe, which flows a washer fluid, inserted thereinto in the axial direction X penetrating the grommet 1 while the grommet 1 and the wire harness WH are attached to the penetration hole 101 of the attachment panel 100, although the pipe is not illustrated in the drawing. Therefore, the partition wall part slit parts 60C are formed to have a bag-like shape (balloon shape) so as to surround the pipe member 71 in the front view (viewed in the axial direction X) in order to insert this pipe into the second partition wall part 12 through the pipe member 71 of the first partition wall part 11. Note that in the present embodiment, one of the two pipe members 71 penetrates the second partition wall part 12 by the partition wall part slit part 60C and the other penetrates only the first partition wall part 11. Thus, the partition wall part slit part 60C continues to the tubular part slit part 60A and divides the second partition wall part 12 into a plurality of sections. Note that the partition wall part slit part 60C may be omitted from the grommet without the pipe member 71. Regarding the position of the radial outer end 60Ca of the partition wall part slit part 60C that continues to the water stopping part 13, it means the position ranging to the position where the thickness of the water stopping part 13 changes with respect to the second partition wall part 12. In addition, the position ranging to the water stopping part 13 means the position to the virtual circle S2 with the central axial line C as the center. Furthermore, regarding the position of the radial outer end 60Ca of the partition wall part slit part 60C, when the distance from the central axial line C to the radial outer end 72Ba of the radial protrusion 72B on the outside in the radial direction is D1, the minimum distance D3 from the central axial line C to the radial outer end 60Ca of the partition wall part slit part 60C on the outside in the radial direction is preferably at least 0.8 times longer.

Note that the partition wall part slit parts 60B and the partition wall part slit parts 60C divide a part of the annular protrusions 72A in the radial direction and are provided between the radial protrusions 72B.

A detailed structure of the grommet 1 is described below. As illustrated in FIG. 1 to FIG. 3 and FIG. 5 to FIG. 7, the grommet 1 includes a sound insulating wall part 50 in the first partition wall part 11.

The sound insulating wall part 50 is formed to have an annular plate shape around the central axial line C. The sound insulating wall part 50 includes a plate shape part 51, and sound insulating convex parts 52 as illustrated in FIG. 1, FIG. 3, and FIG. 5.

The plate shape part 51 is formed to have an annular plate shape around the central axial line C, extending along the radial direction so as to cover at least a part of the penetration hole 101. The sound insulating convex parts 52 are provided at intervals in the radial direction, protrude from both surfaces of the plate shape part 51 in the axial direction X, and are formed to have an annular or arc shape around the central axial line C. The sound insulating convex parts 52 are provided with gap parts 53 held therebetween, on the outside in the radial direction, and on the inside in the radial direction.

In the grommet 1 according to the present embodiment, the thickness of the sound insulating wall part 50 in the axial direction X is increased locally by the sound insulating convex part 52, so that the sound insulating performance is secured. In addition, in the grommet 1 according to the present embodiment, the gap parts 53 between the sound insulating convex parts 52 and on both sides in the radial direction secure the high workability in extending and deforming the main body part 10. As a result, the grommet 1 can have both the sound insulating performance and the high workability in extending and deforming the main body part 10.

As illustrated in FIG. 3, and FIG. 5 to FIG. 7, the grommet 1 includes the folding part 73 between the first partition wall part 11 and the water stopping part 13.

The folding part 73 is formed extending in the axial direction X, being folded back in the radial direction, and then extending in the axial direction X again. An end of the folding part 73 before extending in the axial direction X is connected, in a unified manner, to an outer end part of the sound insulating wall part 50 on the outside in the radial direction of the plate shape part 51 described above. In addition, the radial outer end 73a of the folding part 73 after being folded back in the radial direction and then extending in the axial direction X is connected, in a unified manner, to the water stopping part 13.

By this structure, the folding part 73 secures the high workability in extending and deforming the main body part 10 between the sound insulating wall part 50 and the water stopping part 13. Furthermore, by this structure, the folding part 73 prevents the extension and deformation of the main body part 10 on the sound insulating wall part 50 side from transmitting to the water stopping part 13, and maintains the water stopping performance of the water stopping part 13.

Moreover, as illustrated in FIG. 3 and FIG. 5 to FIG. 8, the grommet 1 includes an interference part 74 in the main body part 10.

The interference part 74 includes a first interference convex part 74A that protrudes from a surface of the first partition wall part 11 that is on the inside of the insertion space part 40 to the inside of the insertion space part 40, and second interference convex parts 74B that protrude from a surface of the second partition wall part 12 that is on the inside of the insertion space part 40 to the inside of the insertion space part 40.

Figure 7:
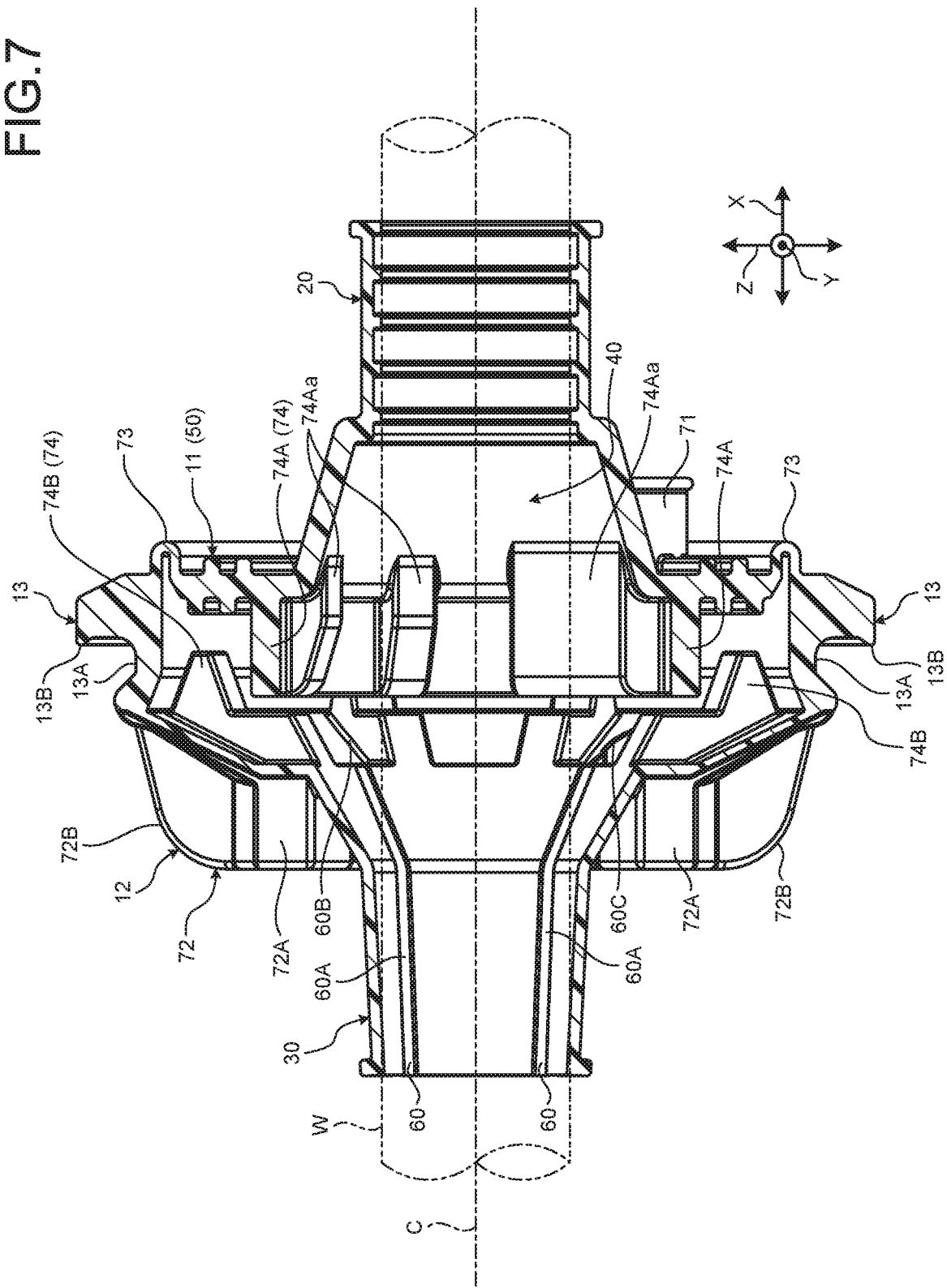
FIG. 7 is a cross-sectional view taken along C-C in FIG. 4.
Figure 8:
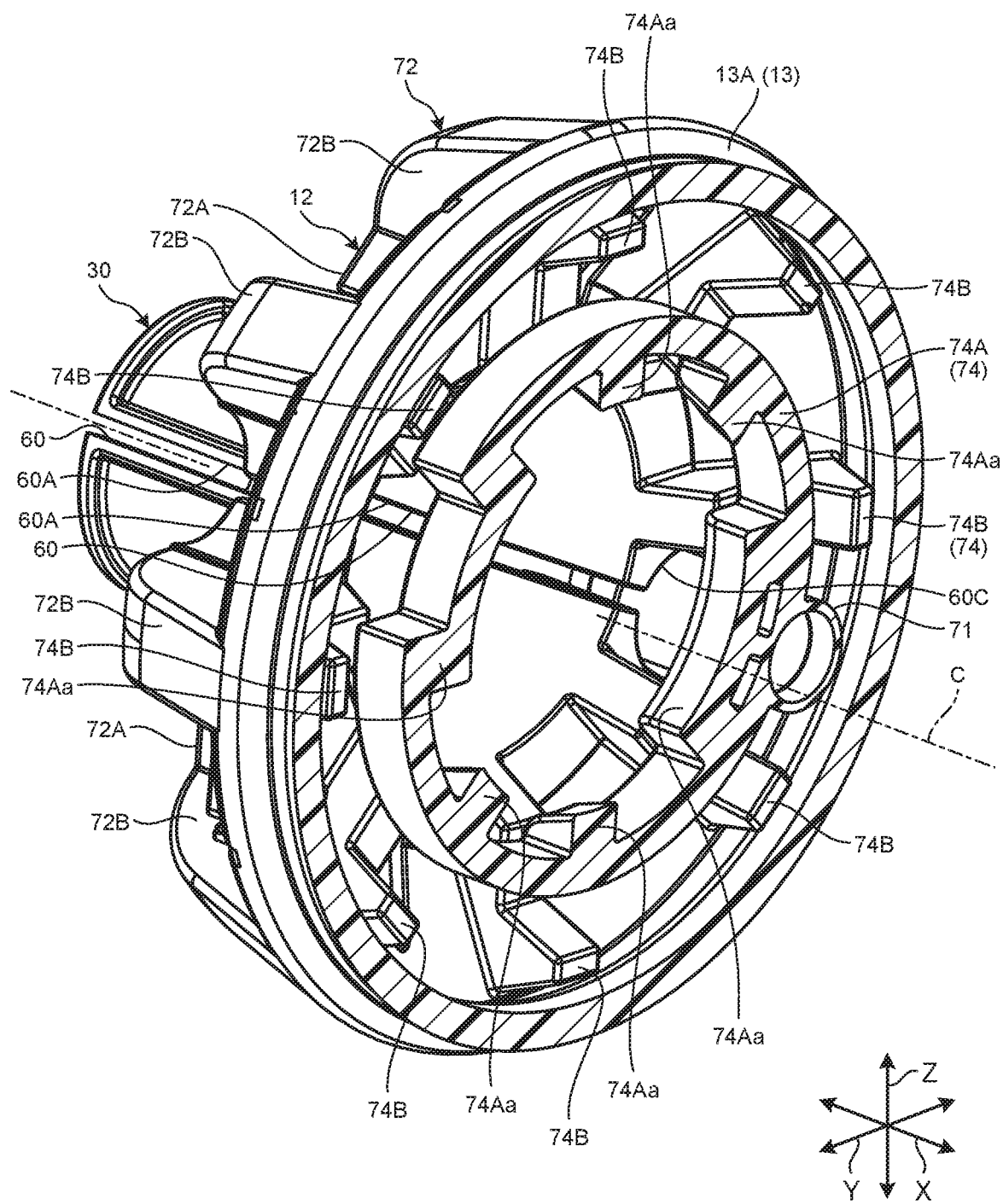
FIG. 8 is a cross-sectional view taken along D-D in FIG. 5.

The first interference convex part 74A is provided in the first partition wall part 11 between the sound insulating wall part 50 and the tubular part 20 as illustrated in FIG. 3, FIG. 5, and FIG. 7. The first interference convex part 74A is positioned in the first partition wall part 11 more on the inside in the radial direction than an inner end of the sound insulating wall part 50 on the inside in the radial direction of the plate shape part 51, and more on the outside in the radial direction than the base end part of the tubular part 20. That is to say, the first interference convex part 74A is unified and connected with the sound insulating wall part 50 and the tubular part 20 in the first partition wall part 11. The first interference convex part 74A protrudes into the insertion space part 40 from between the sound insulating wall part 50 and the tubular part 20, and is formed to have an annular shape with the central axial line C as the center as illustrated in FIG. 8. The first interference convex part 74A includes protrusions 74Aa that protrude from an inner surface of the annular shape to the inside in the radial direction. The protrusions 74Aa are formed at intervals in the circumferential direction around the central axial line C. The protrusions 74Aa are unified and connected with the base end part of the tubular part 20.

The second interference convex part 74B is provided in the second partition wall part 12 in a manner of protruding into the insertion space part 40 so as to exist more on the outside in the radial direction than the first interference convex part 74A as illustrated in FIG. 3, and FIG. 5 to FIG. 8. The second interference convex parts 74B are formed at intervals along the circumferential direction around the central axial line C so as to surround the first interference convex part 74A along the circumferential direction around the central axial line C. Therefore, each second interference convex part 74B is positioned so as to face the first interference convex part 74A in the radial direction on the outside in the radial direction of the first interference convex part 74A. Each second interference convex part 74B is formed in a tapered manner with the size decreasing from a surface of the second partition wall part 12 on the inside of the insertion space part 40 to the inside of the insertion space part 40 gradually in the circumferential direction.

In the case where the wiring material W is inclined in a direction of intersecting with the axial direction X, the structure of the interference part 74 suppresses the deformation of the main body part 10 by the contact between the first interference convex part 74A formed in the first partition wall part 11 and the second interference convex parts 74B formed in the second partition wall part 12. Specifically, in the case where the wiring material W is inclined in the direction of intersecting with the axial direction X, the tubular part 20 and the tubular part 30 are inclined with respect to the axial direction X together with the wiring material W, and the first partition wall part 11 and the second partition wall part 12 want to deform in the radial direction. In regard to this deformation, the interference part 74 suppresses the deformation of the first partition wall part 11 and the second partition wall part 12 in the radial direction by the contact between the first interference convex part 74A and the second interference convex part 74B because these convex parts face each other in the radial direction. Since the interference part 74 suppresses the deformation of the first partition wall part 11 and the second partition wall part 12 in the radial direction, the transmission of this deformation to the water stopping part 13 is suppressed and the water stopping performance of the water stopping part 13 is maintained.

The grommet 1 according to the present embodiment includes the complicated internal structure including the sound insulating wall part 50, the folding part 73, and the interference part 74 as described above in the insertion space part 40 which is inside the main body part 10. In order to form these parts, a die is disposed inside the insertion space part 40 at the molding, and after the molding, this die is extracted.

In view of this, the grommet 1 and the wire harness WH according to the present embodiment include: the water stopping part 13 with the annular shape that is inserted into the penetration hole 101 formed in the attachment panel 100 so as to stop water; the first partition wall part 11 and the second partition wall part 12 disposed on one side and the other side, respectively, of the water stopping part 13 in the axial direction X in a manner of stretching to the inside in the radial direction of the water stopping part 13 so as to close the annular shape of the water stopping part 13; the tubular part 20 and the tubular part 30 provided penetrating the centers of the first partition wall part 11 and the second partition wall part 12, respectively, and allowing the wiring material to be inserted thereinto; and the slit parts 60 that divide one of the tubular parts, that is, the tubular part 30 and the second partition wall part 12 provided with the tubular part 30 continuously to the water stopping part 13.

Therefore, since the grommet 1 and the wire harness WH include the slit parts 60 that divide the tubular part 30 and the second partition wall part 12 continuously to the water stopping part 13, when the die is extracted at the molding, the tubular part 30 and the second partition wall part 12 can be expanded continuously to the outside in the radial direction to the water stopping part 13. As a result, the grommet 1 and the wire harness WH can improve the die release property. Since the die release property is improved, the grommet 1 and the wire harness WH can include the structure with the functionalities including the sound insulating wall part 50, the folding part 73, and the interference part 74 described above inside the insertion space part 40.

In the grommet 1 and the wire harness WH according to the present embodiment, the slit parts 60 are disposed at equal intervals with the tubular part 30 as the center.

Therefore, in the grommet 1 and the wire harness WH, when the die is extracted, the tubular part 30 and the second partition wall part 12 can be expanded uniformly to the outside in the radial direction continuously to the water stopping part 13. As a result, the grommet 1 and the wire harness WH can more improve the die release property.

In addition, in the grommet 1 and the wire harness WH according to the present embodiment, the slit parts 60 divide the tubular part 30 and the second partition wall part 12 into four sections.

Therefore, in the grommet 1 and the wire harness WH, when the die is extracted, the tubular part 30 and the second partition wall part 12 can be expanded into four sections to the outside in the radial direction continuously to the water stopping part 13. As a result, the grommet 1 and the wire harness WH can more improve the die release property.

The grommet 1 and the wire harness WH according to the present embodiment include at least one pipe member 71 that is provided penetrating the first partition wall part 11, and at least one slit part 60 is formed surrounding the pipe member 71.

Therefore, in the grommet 1 and the wire harness WH, when the die is extracted, the tubular part 30 and the second partition wall part 12 can be expanded continuously to the water stopping part 13 while avoiding the pipe member 71. As a result, the grommet 1 and the wire harness WH can improve the die release property even if the pipe member 71 exists.

The grommet 1 and the wire harness WH according to the embodiments of the present invention described above are not limited to the aforementioned embodiments and various changes are possible in the scope of claims. The grommet 1 and the wire harness WH according to the embodiments of the present invention may have a combination of the components described in the embodiments and modifications.

The grommet and the wire harness according to the present embodiment include the slit parts that divide the tubular part and one closing part continuously to the water stopping part; thus, when the die is extracted at the molding, the tubular part and the one closing part can be expanded to the outside in the radial direction continuously to the water stopping part. As a result, the grommet and the wire harness can improve the die release property. Since the grommet and the wire harness improve the die release property, complicated structures with various functionalities can be provided inside the insertion space part between the closing parts.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
   a water stopping part with an annular shape that is inserted into a penetration hole formed in an attachment panel so as to stop water;
   closing parts disposed on one side and the other side, respectively, of the water stopping part in an axial direction in a manner of stretching to an inside in a radial direction of the water stopping part so as to close the annular shape of the water stopping part;
   tubular parts provided penetrating centers of the closing parts, respectively, and allowing a wiring material to be inserted thereinto; and
   a plurality of slit parts that divide one of the tubular parts and one of the closing parts that is provided with the one tubular part, wherein
   the slit parts divide one of the tubular parts and one of the closing parts that is provided with the one tubular part into three or more continuously to the water stopping part,
   the slit parts are disposed at equal intervals with the one tubular part being a center, and
   another of the closing parts includes a sound insulating wall part that is formed to have an annular plate shape around a central axial line and thickness of the sound insulating wall part in the axial direction is increased locally.

2. The grommet according to claim 1, wherein
   the slit parts divide the one tubular part and the one closing part into four sections.

3. The grommet according to claim 2, further comprising:
   at least one pipe member provided penetrating the other closing part, wherein
   at least one of the slit parts is formed surrounding the pipe member.

4. The grommet according to claim 1, further comprising:
at least one pipe member provided penetrating the other closing part, wherein
at least one of the slit parts is formed surrounding the pipe member.

5. A wire harness comprising:
a wiring material with conductivity; and
a grommet provided to the wiring material, wherein
the grommet includes:
- a water stopping part with an annular shape that is inserted into a penetration hole formed in an attachment panel so as to stop water;
- closing parts disposed on one side and the other side, respectively, of the water stopping part in an axial direction in a manner of stretching to an inside in a radia direction of the water stopping part so as to close the annular shape of the water stopping part;
- tubular parts provided penetrating centers of the closing parts, respectively, and allowing a wiring material to be inserted thereinto; and
- a plurality of slit parts that divide one of the tubular parts and one of the closing parts that is provided with the one tubular part, wherein the slit parts divide one of the tubular parts and one of the closing parts that is provided with the one tubular part into three or more continuously to the water stopping part, the slit parts are disposed at equal intervals with the one tubular part being a center, and another of the closing parts includes a sound insulating wall part that is formed to have an annular plate shape around a central axial line and thickness of the sound insulating wall part in the axial direction is increased locally.

* * * * *